US010884241B2

(12) United States Patent
Hatzilias et al.

(10) Patent No.: US 10,884,241 B2
(45) Date of Patent: Jan. 5, 2021

(54) OPTICAL ELEMENT FOR REDUCING STRAY INFRARED LIGHT

(71) Applicant: Facebook Technologies, LLC, Menlo Park, CA (US)

(72) Inventors: Karol Constantine Hatzilias, Kenmore, WA (US); Robin Sharma, Redmond, WA (US); Qi Zhang, Kirkland, WA (US); Gregory Olegovic Andreev, Kirkland, WA (US); Christopher Yuan-Ting Liao, Seattle, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/434,175

(22) Filed: Jun. 7, 2019

(65) Prior Publication Data

US 2020/0386989 A1 Dec. 10, 2020

(51) Int. Cl.
*G02B 27/00* (2006.01)
*G02B 6/10* (2006.01)
*G02B 27/01* (2006.01)

(52) U.S. Cl.
CPC ......... *G02B 27/0093* (2013.01); *G02B 6/102* (2013.01); *G02B 27/0172* (2013.01); *G02B 2027/0138* (2013.01); *G02B 2027/0178* (2013.01)

(58) Field of Classification Search
CPC ..................................................... G02B 6/102
See application file for complete search history.

(56) References Cited

U.S. PATENT DOCUMENTS

| 6,453,100 | B1* | 9/2002 | Takeuchi | G02B 26/004 345/85 |
|---|---|---|---|---|
| 9,986,215 | B1* | 5/2018 | Tardif | H04N 9/3188 |
| 2009/0231687 | A1 | 9/2009 | Yamamoto | |
| 2018/0113508 | A1 | 4/2018 | Berkner-Cieslicki et al. | |
| 2019/0155046 | A1 | 5/2019 | Wall et al. | |

OTHER PUBLICATIONS

International Searching Authority, Patent Cooperation Treaty, European Application No. PCT/US2020/035232, Notification Date: Sep. 15, 2020, 13 pages.

\* cited by examiner

*Primary Examiner* — Omar R Rojas
(74) *Attorney, Agent, or Firm* — Freestone Intellectual Property Law PLLC; Aaron J. Visbeek

(57) ABSTRACT

An optical element for a head mounted display (HMD) includes an illumination layer, an optical combiner, and an optically transparent layer. The illumination layer is configured to emit infrared light towards an eyeward side of the optical element. The optical combiner is configured to receive reflected infrared light that is reflected by an eye of a user and to direct the reflected infrared light towards an infrared camera. The optically transparent layer is disposed between the illumination layer and the eyeward side of the optical element. The optical element may further include one or both of a confinement layer and an infrared extractor. The confinement layer is disposed on a surface of the optically transparent layer to induce waveguiding of confined infrared light propagating within the optically transparent layer. The infrared extractor is disposed on a side-edge of the optically transparent layer to absorb or frustrate the confined infrared light.

20 Claims, 7 Drawing Sheets

OPTICAL ELEMENT FOR REDUCING STRAY INFRARED LIGHT

FIELD OF DISCLOSURE

Aspects of the present disclosure relate generally to head mounted displays, and in particular but not exclusively, relate to an optical element for a head mounted display.

BACKGROUND

A head mounted display (HMD) is a display device, typically worn on the head of a user. HMDs may be used in a variety of applications, such as gaming, aviation, engineering, medicine, entertainment and so on to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. Some HMDs, such as HMDs that provide AR or MR content, perform eye-tracking which may enhance the user's viewing experience. Eye-tracking may be aided, in some cases, by illuminating the eye of the user. Thus, some conventional HMDs may incorporate an eye-tracking system that includes an illumination source as well as a camera for tracking movements of the user's eye. However, in some cases the optics included in the HMD may impede or otherwise interfere with the eye-tracking system.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to an optical element for a head mounted display (HMD). Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

As mentioned above, an HMD may include an eye-tracking system that comprises an illumination source for illuminating an eye of the user and a camera for capturing images of the eye. Conventional designs may place the illumination light sources on the edges of the field of view of the user (e.g. rim of the frame) so that the illumination light sources don't introduce noticeable occlusions into the field of view of the user. In contrast, aspects of the present disclosure provide an optical element for an HMD that includes a plurality of in-field light sources (e.g., micro-LEDs and/or vertical cavity surface emitting laser (VCSEL) diodes) that illuminate the eye with light (e.g., infrared light). Although the light sources may be in the field-of view of a user of the HMD, the light sources may be so small (e.g. 300 microns or less) such that the light sources themselves, are unnoticeable or result in insignificant occlusion to the user.

Figure 1:
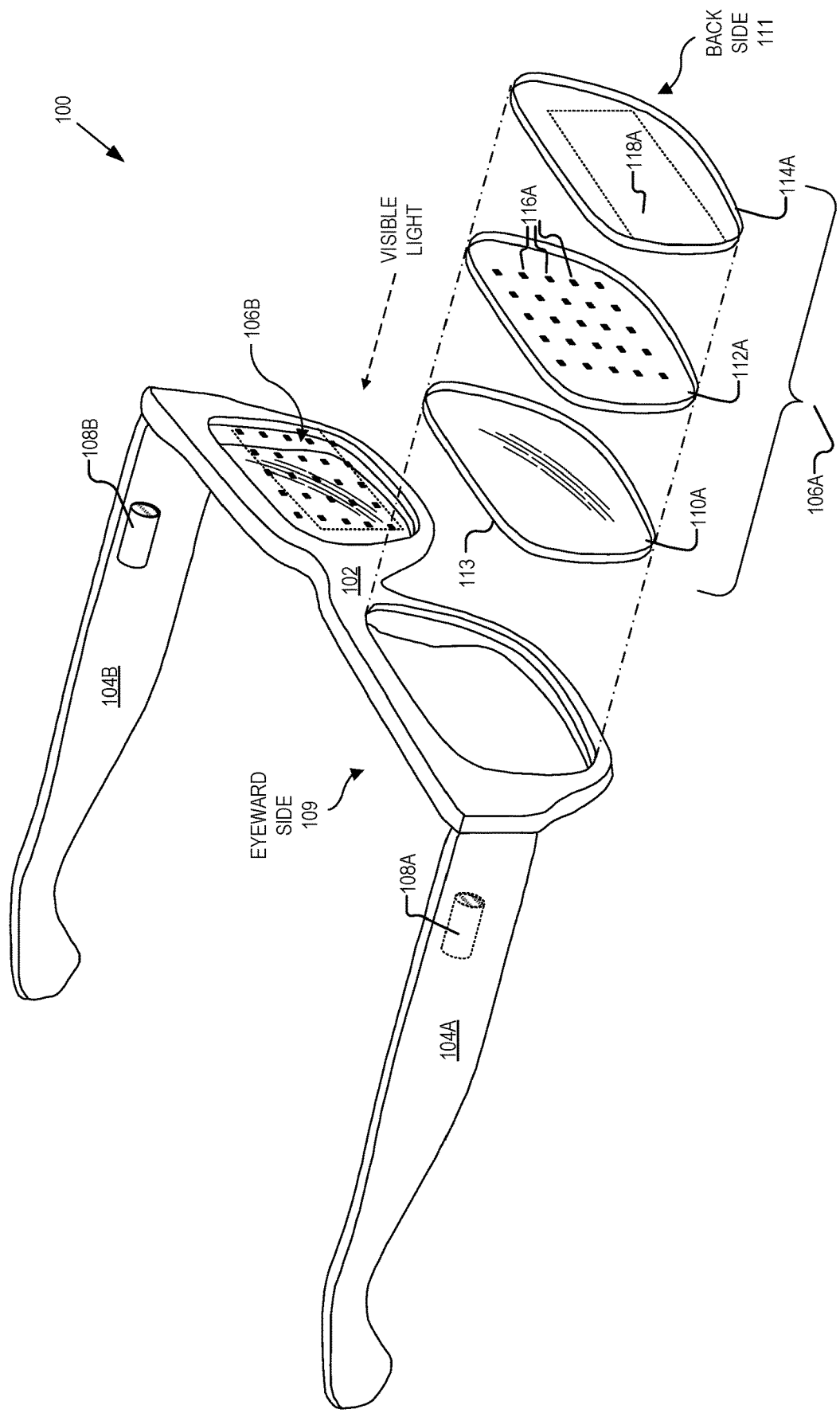
FIG. 1 illustrates a head mounted display (HMD), in accordance with aspects of the present disclosure.

FIG. 1 illustrates an example HMD 100, in accordance with aspects of the present disclosure. The illustrated example of HMD 100 is shown as including a frame 102, temple arms 104A and 104B, and optical elements 106A and 106B. Infrared cameras 108A and 108B are shown as coupled to temple arms 104A and 104B, respectively. FIG. 1 also illustrates an exploded view of an example of optical element 106A. Optical element 106A is shown as including an optically transparent layer 110A, an illumination layer 112A, and a display layer 114A. Illumination layer 112A is shown as including a plurality of in-field light sources 116A and display layer 114A is shown as including an optical combiner 118A.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B (supporting hardware not explicitly illustrated in FIG. 1). The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates optical elements 106A and 106B that are configured to be mounted to the frame 102. In some examples, optical elements 106A and 106B may appear transparent to the user to facilitate augmented reality or mixed reality such that the user can view scene light (e.g., visible light) from the environment while also receiving display light directed to their eye(s) by way of display layer 114A. In further examples, some or all of optical elements 106A and 106B may be incorporated into a virtual reality headset where the transparent nature of the optical elements 106A and 106B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 112A includes a plurality of in-field light sources 116A. As will be described below, each in-field light source 116A may be disposed on a transparent substrate and may be configured to emit light towards an eyeward side 109 of the optical element 106A. In some aspects, the in-field light sources 116A are configured to emit light of a limited spectrum, such as the infrared spectrum (e.g. 700 nm-1000 nm) and/or the near infrared spectrum (e.g. 750 nm-1.4 µm). Each in-field light source 116A may be a micro light emitting diode (micro-LED), an edge emitting LED, or a vertical cavity surface emitting laser (VCSEL) diode.

As mentioned above, conventional eye-tracking solutions may provide light sources disposed around a rim/periphery of a lens. However, placing the light sources directly in front of the eye may be advantageous for calibration and computation of "glint" reflections that can be imaged by a camera such as camera 108A that is positioned to image the eye of a wearer of HMD 100. Furthermore, the ability to selectively illuminate each in-field light source 116A individually (or in groups) may help save power and provide faster and more precise eye-tracking measurements.

While in-field light sources 116A may introduce minor occlusions into the optical element 106A, the in-field light sources 116A, as well as their corresponding routing may be so small as to be unnoticeable or insignificant to a wearer of HMD 100. Additionally, any occlusion from in-field light sources 116A will be placed so close to the eye as to be unfocusable by the human eye and therefore assist in the in-field light sources 116A being not noticeable or insignificant. In some embodiments, each in-field light source 116A has a footprint (or size) that is less than about 200×200 microns.

As mentioned above, the in-field light sources 116A of the illumination layer 112A may be configured to emit infrared light towards the eyeward side 109 of the optical element 106A to illuminate the eye of a user. The optical element 106A is shown as including optical combiner 118A (included in display layer 114A), where the optical combiner 118A is disposed between the illumination layer 112A and a back side 111 of the optical element 106A. In some aspects, the optical combiner 118A is configured to receive reflected infrared light that is reflected by the eye of the user and to direct the reflected infrared light towards the camera 108A. In some examples, the camera 108A is an infrared camera configured to image the eye of the user based on the received reflected infrared light. In some aspects, the optical combiner 118A is transmissive to visible light, such as light incident on the back side 111 of the optical element 106A.

In some examples, the optical combiner 118A may be configured as a volume hologram and/or may include one or more Bragg gratings for directing the reflected infrared light towards the camera 108A.

Display layer 114A may include one or more other optical elements depending on the design of the HMD 100. For example, the display layer 114A may include a waveguide (not shown in FIG. 1) to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optically transparent layer 110A is shown as being disposed between the illumination layer 112A and the eyeward side 109 of the optical element 106A. The optically transparent layer 110A may receive the infrared light emitted by the illumination layer and pass the infrared light to illuminate the eye of the user. As mentioned above, the optically transparent layer 110A may also be transparent to visible light, such as scene light received from the environment, or display light received from the display layer 114A. In some examples, the optically transparent layer 110A has a curvature for focusing light (e.g., display light and/or scene light) to the eye of the user. Thus, the optically transparent layer 110A may, in some examples, may be referred to as a lens. In some aspects, the optically transparent layer 110A has a thickness and/or curvature that corresponds to the specifications of a user. In other words, the optically transparent layer 110A may be a prescription lens. However, in other examples, the optically transparent layer 110A may be a non-prescription lens, also known as a plano lens.

In some examples, the optically transparent layer 110A provides an outermost surface 113 on the eyeward side 109 of the optical element 106A. However, the outermost surface 113 may include one or more blemishes such as surface imperfections and/or areas of roughness due to the manufacturing process. In addition, blemishes may appear on surface 113 due to handling by the user, such as dust, oil, fingerprints, or other smudges. As will be further described below, blemishes on surface 113 may cause the infrared light propagating through the optically transparent layer 110A to stray and/or scatter, which may result in a reduced signal-to-noise (SNR) ratio of the eye-tracking system (e.g. camera 108A). In some examples, each in-field light source 116A has a broad cone of emission (e.g., greater than 40 degrees), such that the emitted infrared light may become confined (e.g., as a result of total internal reflection) within the optically transparent layer 110A. In some instances, this confined infrared light could waveguide within the optically transparent layer 110A and may escape at the blemishes that appear on the surface 113.

Figure 2:
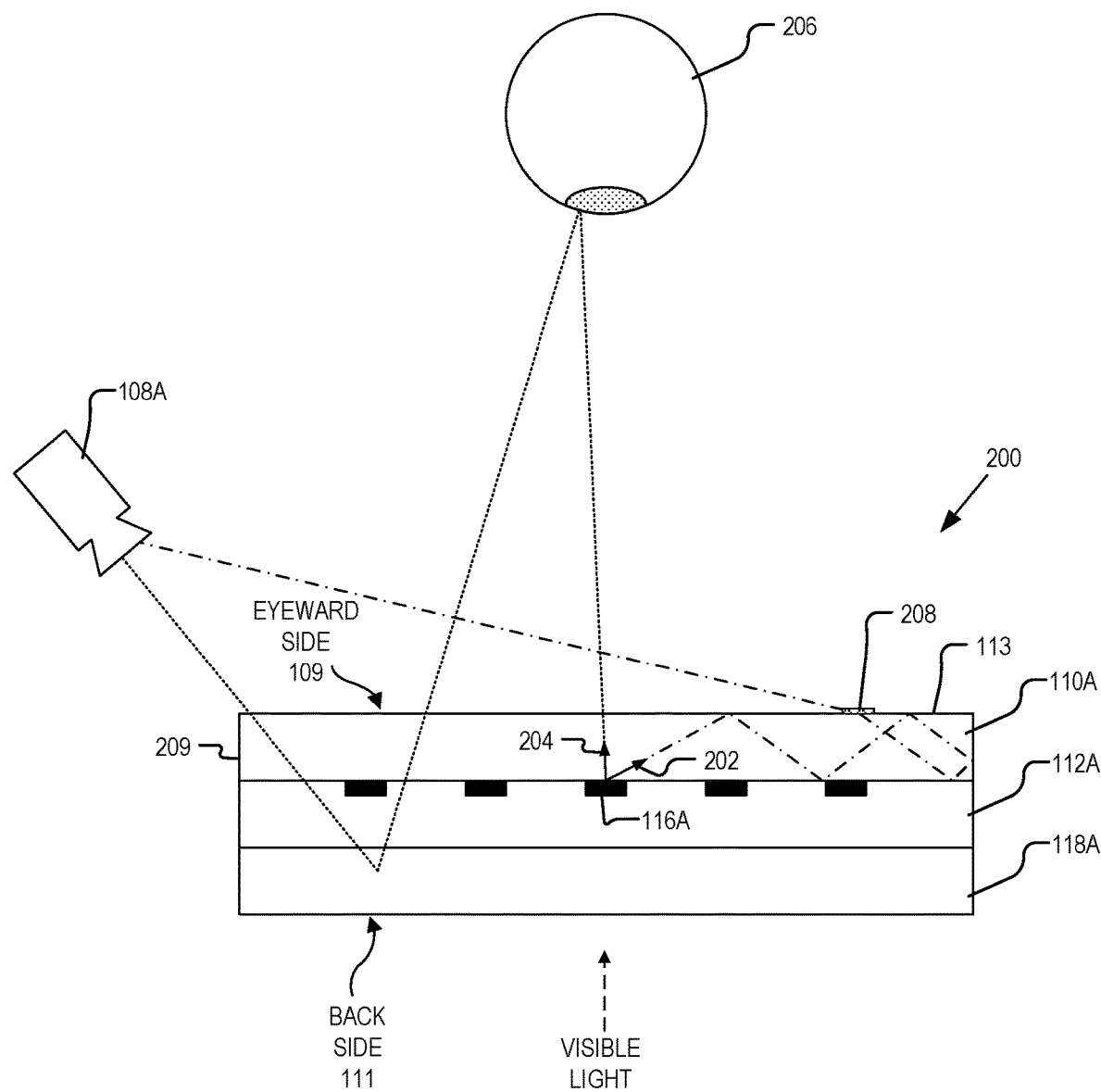
FIG. 2 illustrates confined infrared light propagating through an optical element of an HMD.

By way of example, FIG. 2 illustrates confined infrared light 202 propagating through an optical element 200 of an HMD. As mentioned above, each of the in-field light sources 116A are configured to emit infrared light towards the eyeward side 109 of the optical element 200 to illuminate the eye 206 of a user. For example, infrared light 204, emitted by in-field light source 116A, is shown as following an intended optical path. That is, infrared light 204 is shown as propagating through optically transparent layer 110A, reflecting off the eye 206, then propagating back through the optically transparent layer 110A, through the illumination layer 112A to the optical combiner 118A, which then directs the reflected infrared light 204 towards the camera 108A for imaging.

However, FIG. 2 illustrates the surface 113 of optically transparent layer 110A as including a blemish 208. The illustrated example of blemish 208 may represent a surface imperfection, surface roughness, dirt, oil, fingerprint, smudge, etc., that is present on the surface 113. Thus, some of the infrared light emitted by the in-field light sources 116A may stray and/or scatter when incident on the blemish 208. For example, some infrared light emitted by the in-field light source 116A, such as infrared light emitted at wide angles, may become confined within the optical element, effectively waveguiding within the optically transparent layer 110A. Thus, as shown in FIG. 2, confined infrared light 202 is shown as propagating within the optically transparent layer 110A until the confined infrared light 202 is incident on the blemish 208, at which point, the confined infrared light 202 escapes the optically transparent layer 110A and the optical element 200. Even without a blemish 208, confined infrared light 202 may also escape transparent layer 110A by simply overcoming the critical angle of TIR. In either scenario, this stray infrared light 202 may become incident on the camera 108A, reflect off non-eye surfaces (e.g., nose, cheek, etc.), and may even reflect back through the optical element to the optical combiner 118A. In all these cases, the stray infrared light 202 may reduce the SNR of the eye-tracking system which may reduce the accuracy and/or increase the power requirements of the system.

Accordingly, aspects of the present disclosure provide for one or more mechanisms for reducing the occurrences of confined infrared light 202 that may escape the optical element 200. As will be described further below, in one aspect, a confinement layer may be disposed on the surface 113 to induce waveguiding of the confined infrared light 202 that is propagating within the optically transparent layer 110A. In some examples, the confinement layer may include a low-index coating that is applied to surface 113. In another aspect, an infrared extractor may be disposed on a side-edge 209 of the optically transparent layer 110A. In some examples, the infrared extractor may include an infrared absorptive material for absorbing the confined infrared light 202. In other examples, the infrared extractor may be configured to frustrate total internal reflection (TIR) of the confined infrared light 202. When used together, the confinement layer may induce waveguiding of the confined infrared light 202 towards the infrared extractor on the side-edge 209 of the optically transparent layer 110A, where the infrared extractor then absorbs and/or frustrates the confined infrared light 202.

Figure 3:
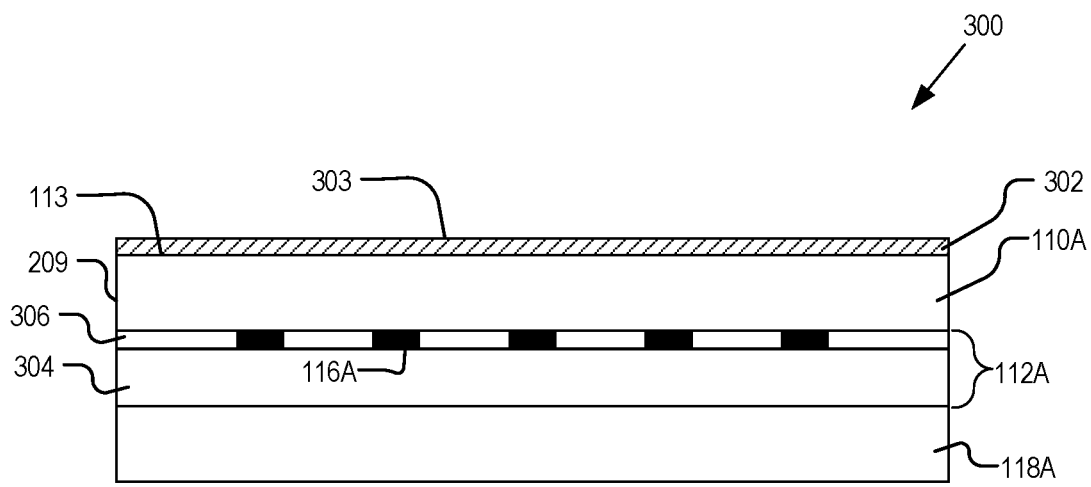
FIG. 3 illustrates a side-view of an optical element that includes a confinement layer, in accordance with aspects of the present disclosure.

FIG. 3 illustrates a side-view of an optical element 300 that includes a confinement layer 302, in accordance with aspects of the present disclosure. Optical element 300 is one possible implementation of optical element 106A and/or 106B of FIG. 1. In the example of FIG. 3, the illumination layer 112A is shown as including a transparent substrate 304, a plurality of in-field light sources 116A, and an encapsulation layer 306. In some examples, the in-field light sources 116A are VCSEL diodes formed on the transparent substrate 304 (e.g., glass, sapphire, plastic, flexible film, etc.) along with one or more transparent routing (e.g., transparent conductive oxide). The encapsulation layer 306 is disposed on the transparent substrate 304 to protect and/or provide structural support to the in-field light sources 116A.

In some aspects, confinement layer 302 is disposed directly on the surface 113 of the optically transparent layer 110A to provide a new outermost surface 303 on the eyeward side (e.g. eyeward side 109) of the optical element 300. In some implementations, confinement layer 302 is a low-index coating that is applied to the surface 113 of the optically transparent layer 110A. Thus, in some examples, confinement layer 302 may have a refractive index that is lower than a refractive index of the optically transparent layer 110A. For example, optically transparent layer 110A may have a refractive index of 1.5, whereas the confinement layer 302 may have a refractive index in the range of 1.3 to 1.4.

In some examples, confinement layer 302 is a low-index hard coat material that is applied to the surface 113 to provide a low-index coating that protects the surface 113 from scratches and may increase the durability and/or provide increased longevity of the optically transparent layer 110A. The low-index hard coat material may be applied to the surface 113 by a thermal curing or by an ultraviolet (UV) curing process. Thus, in some examples, the confinement layer 302 has a hardness that is greater than the hardness of the optically transparent layer 110A (e.g., measured as a pencil-hardness, Mohs hardness, and/or Martens hardness).

In some examples, the confinement layer 302 may be relatively thin (e.g., 5-10 microns). While the confinement layer 302 may be thin, it may, in some implementations have a thickness sufficient to reflect all the different modes of the infrared light emitted by the in-field light sources 116A.

In operation, the confinement layer 302 is configured to induce waveguiding of confined infrared light (e.g., confined infrared light 202 of FIG. 2) by encouraging reflection of the confined infrared light at the boundary (e.g., surface 113) between the confinement layer 302 and the optically transparent layer 110A. In some examples, the confinement layer 302 induces waveguiding of the confined infrared light towards the side-edge 209 of the optically transparent layer 110A, such that the confined infrared light escapes the optical element 300 at the side-edge 209 rather than at the surface 113. In some cases, confined infrared light escaping at the side-edge 209 reduces the occurrences of stray infrared light that may become incident on the camera of the eye-tracking system (e.g., camera 108A and/or camera 108B).

Figure 4A:
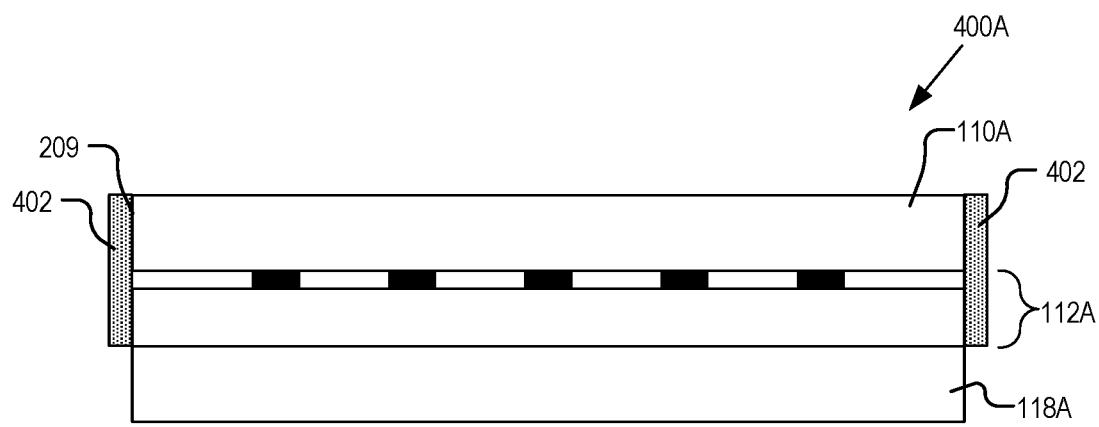
FIGS. 4A and 4B illustrate side-views of an optical element that includes an infrared extractor, in accordance with aspects of the present disclosure.
Figure 4B:
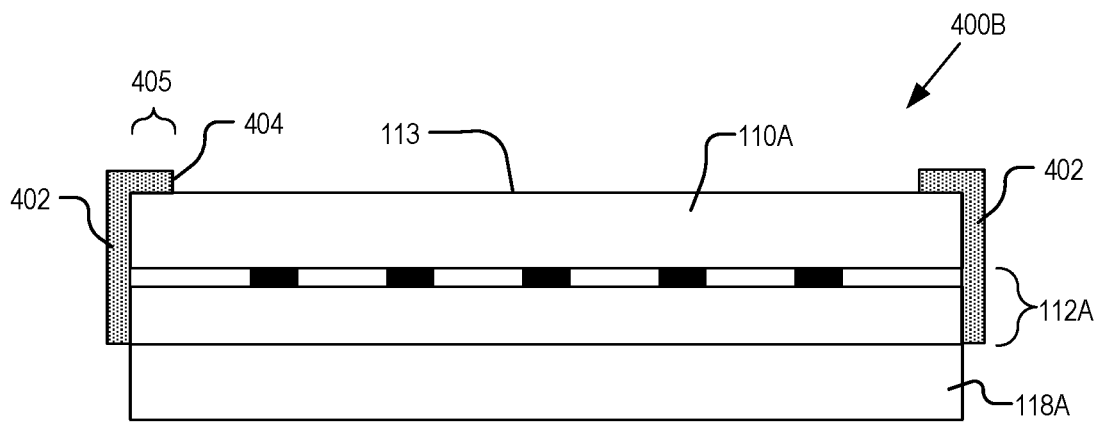

FIGS. 4A and 4B illustrate side-views of optical elements 400A and 400B, respectively, that each include an infrared extractor 402, in accordance with aspects of the present disclosure. Optical elements 400A and 400B are possible implementations of optical element 106A and/or 106B of FIG. 1.

With respect to FIG. 4A, infrared extractor 402 may be disposed on a side-edge 209 of the optically transparent layer 110A. As shown in FIG. 4A, in some examples, the infrared extractor 402 may also be optionally disposed on the side-edge of the illumination layer 112A. The infrared extractor 402 may be configured to absorb the confined infrared light (e.g., confined infrared light 202 of FIG. 2) and/or to frustrate total internal reflection (TIR) of the confined infrared light.

Thus, in some aspects, the infrared extractor 402 may include an infrared absorptive material for absorbing the confined infrared light. For example, the infrared extractor 402 may include a blackening (e.g., black pigment, such as a carbon and/or copper chrome black) of the side-edge 209 to absorb at least some of the confined infrared light that is incident on the side-edge 209.

In other examples, the infrared extractor 402 may be configured to frustrate total internal reflection (TIR) of the confined infrared light. For example, infrared extractor 402 may include a low-index medium disposed on the side-edge 209 to provide an optical interface between the low-index medium and the optically transparent layer 110A, where an additional high-index medium is then placed within several wavelength's distance from this optical interface (e.g., side-edge 209) such that energy of the confined infrared light is passed across the low-index medium into the high-index medium though a process referred to as frustrated TIR (FTIR).

FIG. 4B illustrates an optional configuration of the infrared extractor 402 as including a top section 404. That is, the infrared extractor 402 of FIG. 4B is illustrated as including a top section 404 that is disposed on a portion 405 of the surface 113 of the optically transparent layer 110A. In some examples, the top section 404 is configured the same as the rest of infrared extractor 402 to absorb and/or frustrate the confined infrared light. In some aspects, the portion 405 of the surface 113 corresponds to a hidden portion of a supporting structure of the HMD, such as the rims of frame 102 of FIG. 1.

Figure 5:
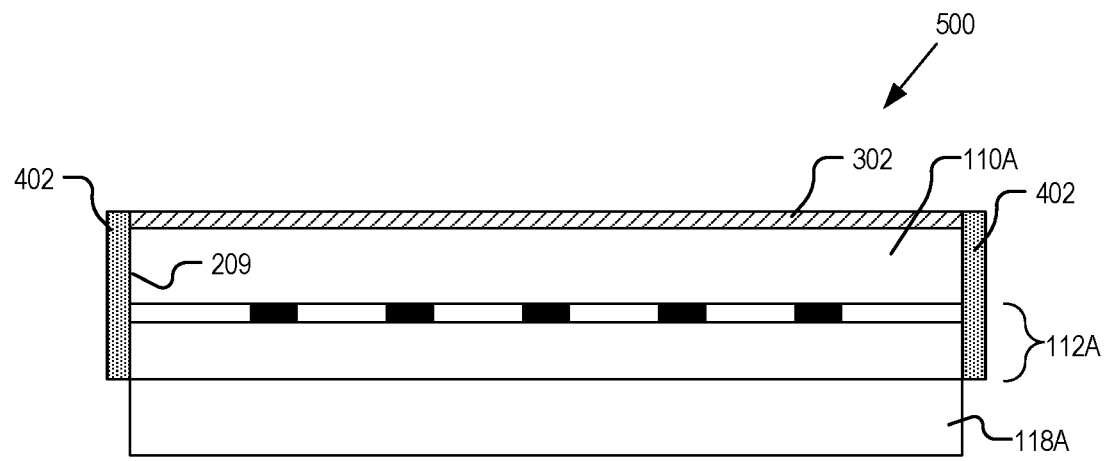
FIG. 5 illustrates a side-view of an optical element that includes both a confinement layer and an infrared extractor, in accordance with aspects of the present disclosure.

In various examples of the present disclosure, an optical element for an HMD may be provided that includes a confinement layer only, such as the confinement layer 302 of the optical element 300 of FIG. 3. As mentioned above, the confinement layer 302 may be configured to induce waveguiding of the confined infrared light that is propagating within the optically transparent layer 110A. The inducement of waveguiding of the confined infrared light, by itself, may reduce the instances of stray and/or scattered infrared light that may occur due to blemishes that are present on the surface 113 of the optically transparent layer 110A. In other examples, an optical element for the HMD may be provided that includes an infrared extractor only, such as the infrared extractor 402 of the optical elements 400A and 400B of FIGS. 4A and 4B. As discussed above, the infrared extractor 402 may be configured to absorb and/or frustrate the confined infrared light propagating within the optically transparent layer 110A. The absorption and/or frustration of the confined infrared light, by itself, may also reduce the instances of stray and/or scattered infrared light from escaping the optically transparent layer 110A. However, in yet another example, an optical element may be provided that utilizes both a confinement layer and an infrared extractor. For example, FIG. 5 illustrates a side-view of an optical element 500 that includes both a confinement layer 302 and an infrared extractor 402, in accordance with aspects of the present disclosure. Optical element 500 is one possible implementation of optical element 106A and/or 106B of FIG. 1. When used together, the confinement layer 302 may induce waveguiding of the confined infrared light (e.g., confined infrared light 202) towards the infrared extractor 402 on the side-edge 209 of the optically transparent layer 110A, where the infrared extractor 402 then absorbs and/or frustrates the confined infrared light.

Figure 6:
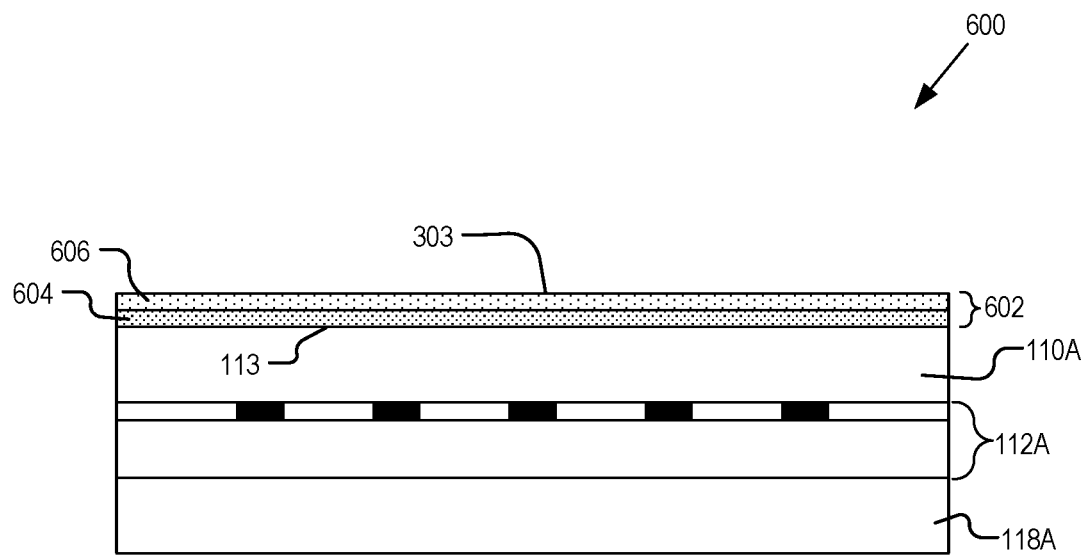
FIG. 6 illustrates a side-view of an optical element that includes a confinement layer having a low-index coating and a hard-coat material, in accordance with aspects of the present disclosure.

As mentioned above, in some examples, the confinement layer, such as confinement layer 302 of FIG. 3, may be a low-index hard coat material that is applied to the surface 113 of the optically transparent layer 110A. However, in other examples, the confinement layer may be comprised of several layers including both a low-index material and a separate hard coat material. By way of example, FIG. 6 illustrates a side-view of an optical element 600 that includes a confinement layer 602 having a low-index coating 604 and a hard-coat material 606, in accordance with aspects of the present disclosure. Optical element 600 is one possible implementation of optical element 106A and/or 106B of FIG. 1 and illustrates one possible example of the confinement layer 302 of FIG. 3. As shown in FIG. 6, the low-index coating 604 is disposed on the surface 113 of the optically transparent layer 110A and the hard-coat material 606 is disposed on the low-index coating 604. In some examples, the hard-coat material 606 provides the outermost surface 303 on the eyeward side (e.g., eyeward side 109) of the optical element 600. The low-index coating 604 may have a refractive index that is less than a refractive index of the optically transparent layer 110A and the hard-coat material 606 may have a hardness that is greater than a hardness of the low-index coating 604 and/or of the optically transparent layer 110A.

Figure 7:
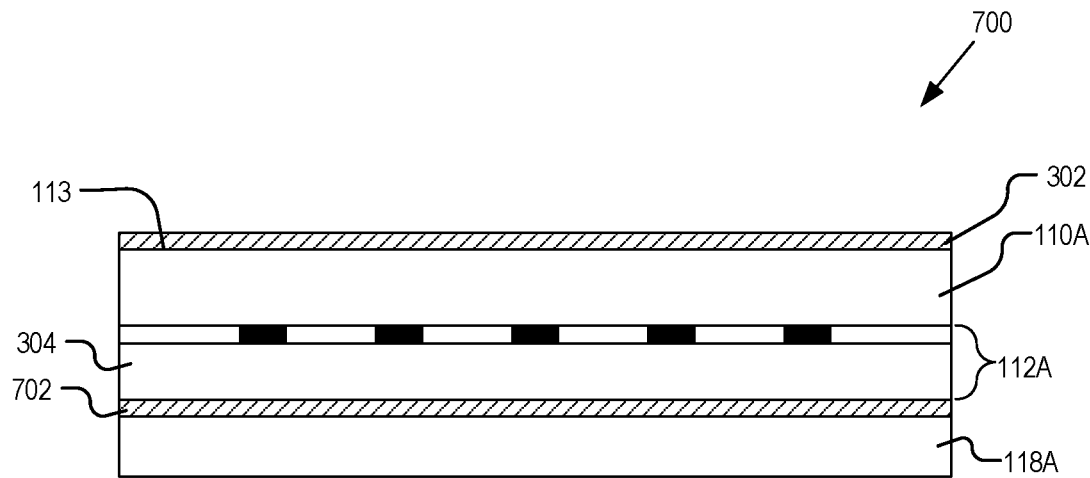
FIG. 7 illustrates a side-view of an optical element that includes a confinement layer and an intermediate confinement layer, in accordance with aspects of the present disclosure.

FIG. 7 illustrates a side-view of an optical element 700 that includes a confinement layer 302 and an intermediate confinement layer 702, in accordance with aspects of the present disclosure. Optical element 700 is one possible implementation of optical element 106A and/or 106B of FIG. 1. As shown in FIG. 7, the intermediate confinement layer 702 is disposed between the illumination layer 112A and the optical combiner 118A. The intermediate confinement layer 702 may be configured to further induce waveguiding of confined infrared light that propagates within the optical element 700. In some examples, the intermediate confinement layer 702 has a refractive index that is less than a refractive index of the illumination layer 112A (e.g., less than a refractive index of the transparent substrate 304). In operation, the intermediate confinement layer 702 may prevent the confined infrared light from becoming incident on the optical combiner 118A. In some examples, the intermediate confinement layer 702 induces waveguiding of the confined infrared light towards a side-edge of the optical element 700, such that the confined infrared light escapes the optical element 700 at the side-edge rather than at the surface 113. In some cases, confined infrared light escaping at the side-edge reduces the occurrences of stray infrared light that may become incident on the camera of the eye-tracking system (e.g., camera 108A and/or camera 108B). When used in conjunction with an infrared extractor, such as infrared extractor 402 of FIG. 4A, the intermediate confinement layer 702 may induce waveguiding of the confined infrared light towards the infrared extractor for absorption and/or frustration.

Figure 8:
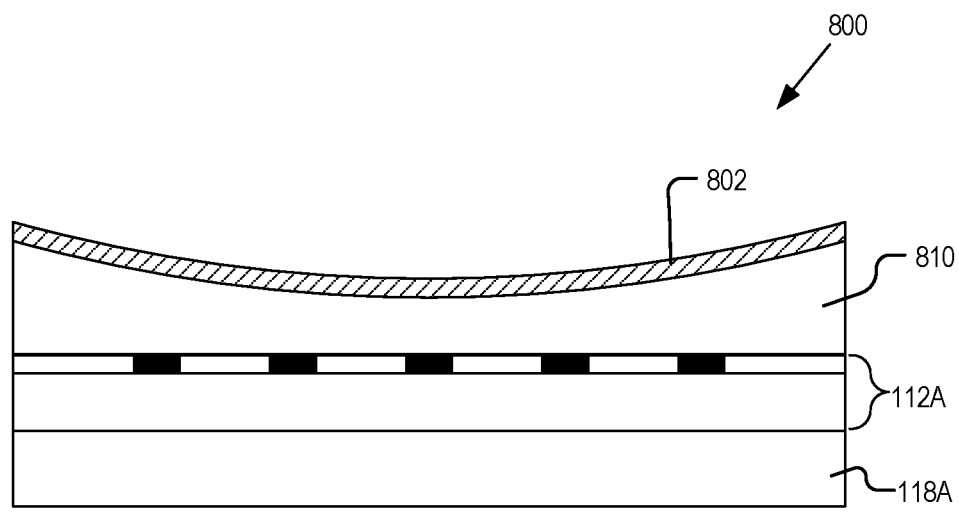
FIG. 8 illustrates a side-view of an optical element that includes a confinement layer that conforms to a curvature of a corresponding optically transparent layer, in accordance with aspects of the present disclosure.

In some examples, the optically transparent layers described herein may have no optical power. That is, in some implementations, the optically transparent layer may be a non-prescription lens. However, in other examples, the optically transparent layer may have a curvature for focusing light (e.g., display light and/or scene light) to the eye of the user. By way of example, FIG. 8 illustrates a side-view of an optical element 800 that includes a confinement layer 802 that conforms to a curvature of a corresponding optically transparent layer 810, in accordance with aspects of the present disclosure. Optical element 800 is one possible implementation of optical element 106A and/or 106B of FIG. 1. Thus, the optically transparent layer 810 may be referred to as a prescription lens, where the optically transparent layer 810 includes a curvature that corresponds to the specifications of a user. As shown in FIG. 8, the confinement layer 802 conforms to the curvature of the optically transparent layer 810. In some aspects, the confinement layer 802 is a single layer of low-index hard coat material that conforms to the curvature. In other aspects, the confinement layer 802 includes a low-index coating (e.g., low-index coating 604 of FIG. 6) and a hard-coat material (e.g., hard-coat material 606 of FIG. 6) that both conform to the curvature of the optically transparent layer 810.

In some examples, the optically transparent layers described herein may be a separate transparent medium (e.g., glass, plastic, etc.) that is affixed to the illumination layer 112A. For example, FIG. 3 illustrates the optically transparent layer 110A affixed to the encapsulation layer 306 of the illumination layer 112A. However, in other examples, the optically transparent layers, as provided herein, may be integrated with the encapsulation layer 306. That is, the optically transparent layer may also be configured to function as the encapsulation layer for providing support and/or protection to the in-field light sources 116A, thus obviating the need for a separate encapsulation layer.

Figure 9A:
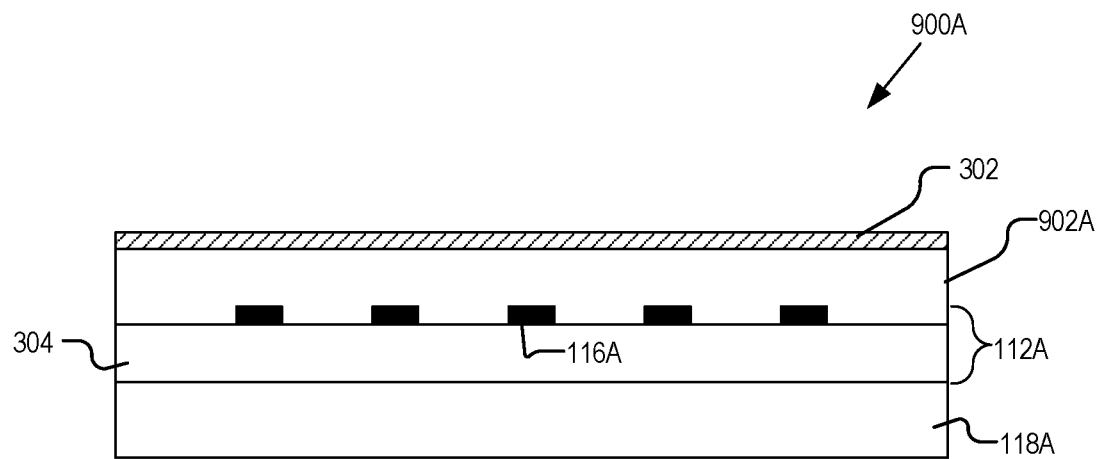
FIG. 9A illustrates a side-view of an optical element that includes an optically transparent layer disposed to encapsulate vertical cavity surface emitting laser (VCSEL) diodes of an illumination layer, in accordance with aspects of the present disclosure.

By way of example, FIG. 9A illustrates a side-view of an optical element 900A that includes an optically transparent layer 902A disposed to encapsulate the in-field light sources 116A (e.g., vertical cavity surface emitting laser (VCSEL) diodes) of an illumination layer 112A, in accordance with aspects of the present disclosure. Optical element 900A is one possible implementation of optical element 106A and/or 106B of FIG. 1. As shown in FIG. 9A, the optically transparent layer 902A is disposed on the transparent substrate 304 and may be configured to encapsulate the in-field light sources 116A.

Figure 9B:
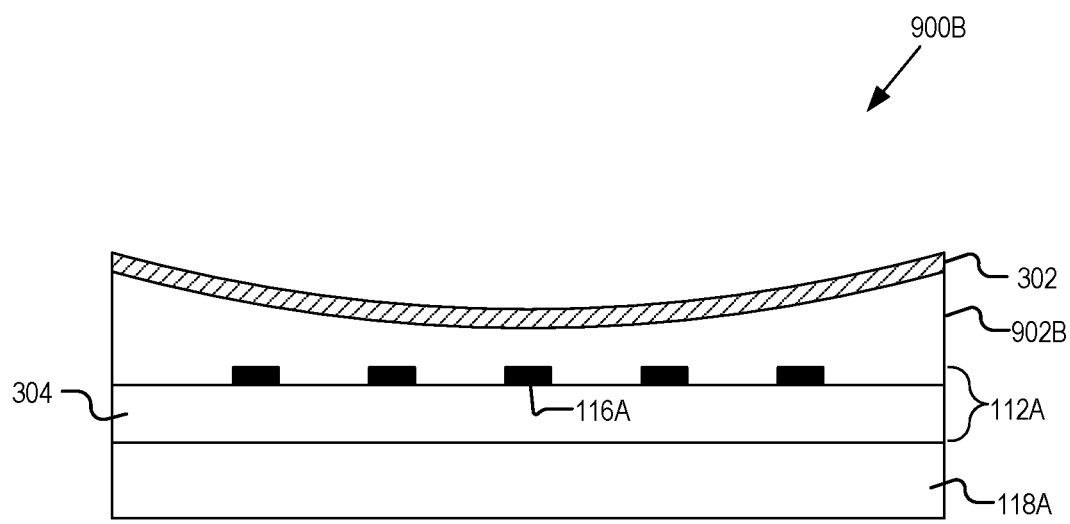
FIG. 9B illustrates a side-view of an optical element that includes an optically transparent layer having a curvature and disposed to encapsulate VCSEL diodes of an illumination layer, in accordance with aspects of the present disclosure.

FIG. 9B illustrates a side-view of an optical element 900B that includes an optically transparent layer 902B having a curvature and disposed to encapsulate in-field light sources 116A of an illumination layer 112A, in accordance with aspects of the present disclosure. Optical element 900B is one possible implementation of optical element 106A and/or 106B of FIG. 1. Similar to the example discussed above with reference to FIG. 9A, the optically transparent layer 902B is disposed on the transparent substrate 304 and may be configured to encapsulate the in-field light sources 116A. However, as shown, the optically transparent layer 902B has a curvature for focusing light to the eye of a user of the HMD. Thus, the optically transparent layer 902B may be referred to as a prescription lens, where the curvature of the optically transparent layer 902B corresponds to the specifications of a user. In some examples, the optically transparent layer 902B is formed by over molding a prescription lens using casting or compression molding with the transparent substrate 304 (including in-field light sources 116A) used as an insert.

Figure 10A:
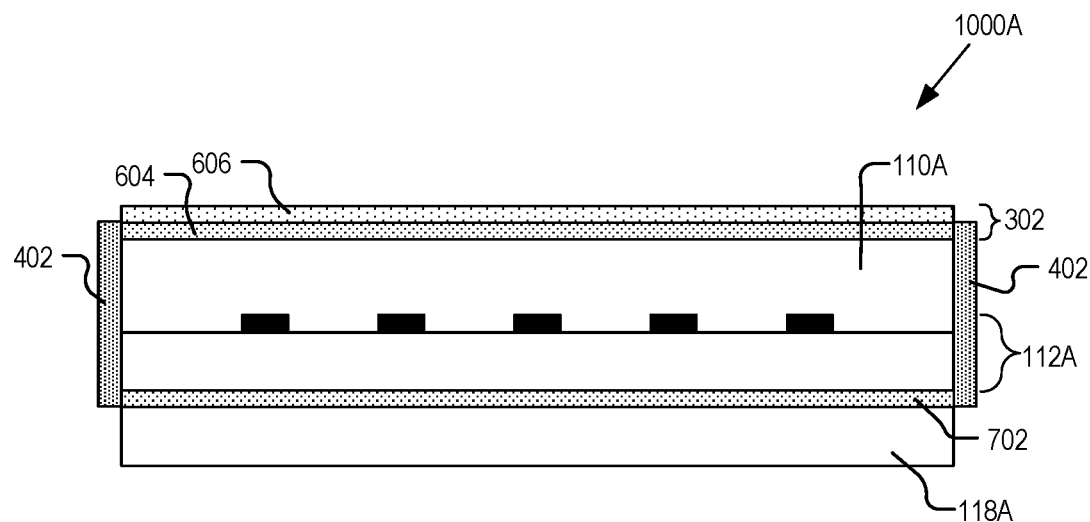
FIG. 10A illustrates a side-view of an optical element that includes a confinement layer, an infrared extractor, and an intermediate confinement layer, in accordance with aspects of the present disclosure.

FIG. 10A illustrates a side-view of an optical element 1000A that includes a confinement layer 302, an infrared extractor 402, and an intermediate confinement layer 702, in accordance with aspects of the present disclosure. Optical element 1000A is one possible implementation of optical element 106A and/or 106B of FIG. 1

Figure 10B:
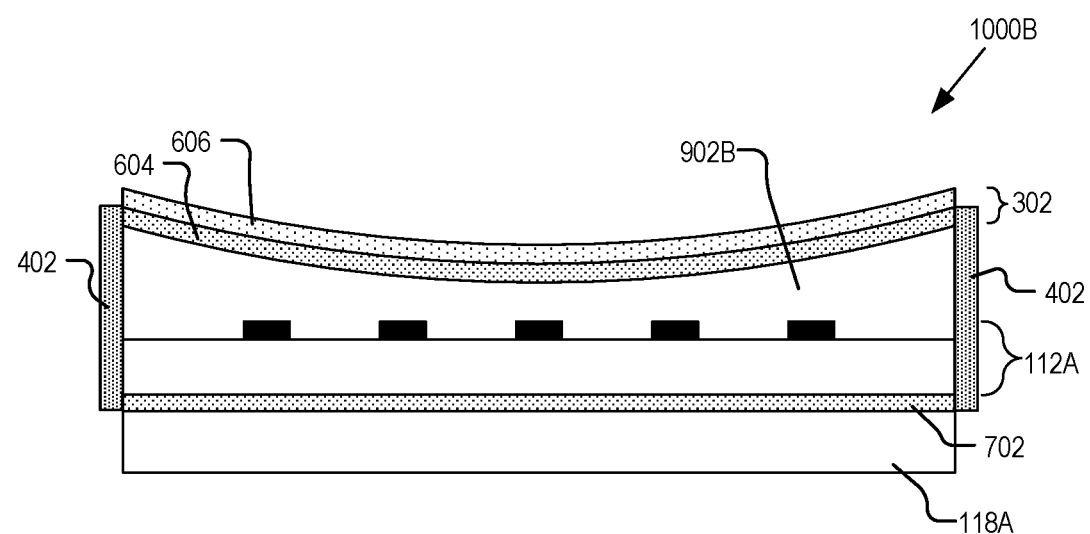
FIG. 10B illustrates a side-view of an optical element that includes a confinement layer that conforms to a curvature of a corresponding optically transparent layer, as well as an infrared extractor and an intermediate confinement layer, in accordance with aspects of the present disclosure.

FIG. 10B illustrates a side-view of an optical element 1000B that includes a confinement layer 302 that conforms to a curvature of a corresponding optically transparent layer 902B, as well as an infrared extractor 402 and an intermediate confinement layer 702, in accordance with aspects of the present disclosure. Optical element 1000B is one possible implementation of optical element 106A and/or 106B of FIG. 1.

The functionality of one or more components described above with reference to FIGS. 1-10B may be implemented in various ways consistent with the teachings herein. In some designs, the functionality of these components may be implemented as one or more discrete optical components. In addition, the components and functions represented by FIGS. 1-10B, as well as other components and functions described herein, may be implemented using any suitable means. Such means also may be implemented, at least in part, using corresponding structure as taught herein. For example, a means for emitting infrared light towards an eyeward side of an optical element may correspond at least in some aspects to, for example, the illumination layer 112A of FIGS. 1-10B. In addition, a means for receiving reflected infrared light (i.e., reflected by an eye of a user of the HMD) and for directing the reflected infrared light towards an infrared camera may correspond at least in some aspects to, for example, the optical combiner 118A of FIGS. 1-10B. Even still, a means for passing infrared light to an eye of the user may correspond at least in some aspects to, for example, the optically transparent layer 110A of FIGS. 1-7, the optically transparent layer 810 of FIG. 8, the optically transparent layer 902A of FIG. 9A, the optically transparent layer 902B of FIG. 9B, the optically transparent layer 110A of FIG. 10A, and/or the optically transparent layer 902B of FIG. 10B. A means for inducing waveguiding of confined infrared light propagating within an optically transparent layer may correspond at least in some aspects to, for example, the confinement layer 302 of FIGS. 3, 5, 7, 9A, 9B and 10A, the confinement layer 602 of FIGS. 6 and 10B, and/or the confinement layer 802 of FIG. 8. Similarly, a means for absorbing or frustrating confined infrared light that is propagating within an optically transparent layer may correspond at least in some aspects to, for example, the infrared extractor 402 of FIGS. 4A, 4B, 5, 10A, and 10B.

Thus, in some aspects one or more of such means may be implemented using one or more optical components, layers, mediums, or other suitable structure as taught herein.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical element comprising:
    an illumination layer configured to emit infrared light towards an eyeward side of the optical element;
    an optical combiner disposed between the illumination layer and a back side of the optical element, wherein the optical combiner is configured to receive reflected infrared light that is reflected by an eye and to direct the reflected infrared light towards an infrared camera;
    an optically transparent layer disposed between the illumination layer and the eyeward side of the optical element to pass the infrared light;
    a confinement layer disposed on a surface of the optically transparent layer to induce waveguiding of confined infrared light propagating within the optically transparent layer; and
    an infrared extractor disposed on a side-edge of the optically transparent layer to absorb or frustrate the confined infrared light.

2. The optical element of claim 1, wherein the confinement layer has a refractive index lower than a refractive index of the optically transparent layer.

3. The optical element of claim 1, wherein the confinement layer comprises a hard-coat material.

4. The optical element of claim 1, wherein the confinement layer provides an outermost surface on the eyeward side of the optical element.

5. The optical element of claim 1, wherein the confinement layer is configured to induce waveguiding of the confined infrared light towards the infrared extractor.

6. The optical element of claim 1, further comprising an intermediate confinement layer disposed between the illumination layer and the optical combiner.

7. The optical element of claim 6, wherein the infrared extractor is further disposed on a side-edge of the illumination layer and on a side-edge of the intermediate confinement layer.

8. The optical element of claim 1, wherein the surface of the optically transparent layer has a curvature for focusing visible light to the eye, and wherein the confinement layer conforms to the curvature.

9. The optical element of claim 1, wherein the illumination layer comprises:
    a transparent substrate; and
    a plurality of in-field vertical cavity surface emitting laser (VCSEL) diodes disposed on the transparent substrate for emitting the infrared light.

10. The optical element of claim 9, wherein the optically transparent layer is disposed on the transparent substrate to encapsulate the plurality of in-field VCSEL diodes.

11. The optical element of claim 1, wherein the infrared extractor is further disposed on a portion of the surface of the optically transparent layer.

12. The optical element of claim 1, wherein the infrared extractor comprises an infrared absorptive material for absorbing the confined infrared light.

13. The optical element of claim 1, wherein the infrared extractor is configured to frustrate total internal reflection (TIR) of the confined infrared light propagating within the optically transparent layer.

14. An optical element for a head mounted display (HMD), the optical element comprising:
    an illumination layer configured to emit infrared light towards an eyeward side of the optical element;
    an optical combiner disposed between the illumination layer and a back side of the optical element, wherein the optical combiner is configured to receive reflected infrared light that is reflected by an eye of a user of the HMD and to direct the reflected infrared light towards an infrared camera of the HMD;
    an optically transparent layer disposed between the illumination layer and the eyeward side of the optical element to pass the infrared light; and
    a confinement layer disposed on a surface of the optically transparent layer to induce waveguiding of confined infrared light propagating within the optically transparent layer.

15. The optical element of claim 14, wherein the confinement layer has a refractive index lower than a refractive index of the optically transparent layer.

16. The optical element of claim 14, wherein the surface of the optically transparent layer has a curvature for focusing visible light to the eye of the user, and wherein the confinement layer conforms to the curvature.

17. The optical element of claim 14, wherein the illumination layer comprises:
    a transparent substrate; and
    a plurality of in-field vertical cavity surface emitting laser (VCSEL) diodes disposed on the transparent substrate for emitting the infrared light, wherein the optically transparent layer is disposed on the transparent substrate to encapsulate the plurality of in-field VCSEL diodes.

18. An optical element for a head mounted display (HMD), the optical element comprising:
    an illumination layer configured to emit infrared light towards an eyeward side of the optical element;
    an optical combiner disposed between the illumination layer and a back side of the optical element, wherein the optical combiner is configured to receive reflected infrared light that is reflected by an eye of a user of the HMD and to direct the reflected infrared light towards an infrared camera of the HMD;
    an optically transparent layer disposed between the illumination layer and the eyeward side of the optical element to pass the infrared light; and
    an infrared extractor disposed on a side-edge of the optically transparent layer to absorb or frustrate confined infrared light propagating within the optically transparent layer.

19. The optical element of claim 18, wherein the infrared extractor comprises an infrared absorptive material for absorbing the confined infrared light.

20. The optical element of claim 18, wherein the infrared extractor is configured to frustrate total internal reflection (TIR) of the confined infrared light propagating within the optically transparent layer.

* * * * *